United States Patent [19]

Sibilia et al.

[11] Patent Number: 4,566,991

[45] Date of Patent: Jan. 28, 1986

[54] PROCESS FOR PREPARING CONDUCTING POLYMERIC COMPOSITIONS

[75] Inventors: John P. Sibilia, Livingston, N.J.; Hyo-gun Kim, Pittsford, N.Y.; Arthur R. Paterson, Morristown, N.J.

[73] Assignee: Allied Corporation, Morris Township, Morris County, N.J.

[21] Appl. No.: 394,752

[22] Filed: Jul. 2, 1982

[51] Int. Cl.$^4$ .............................................. H01B 1/02
[52] U.S. Cl. .................................... 252/512; 252/513; 252/514; 252/518; 252/519; 252/521; 524/401; 524/439; 524/914

[58] Field of Search ............... 524/414, 423, 607, 429, 524/413, 410, 403, 409, 407, 408, 430, 417, 424, 420, 430, 432, 431, 435, 437, 439, 914; 260/DIG. 15, DIG. 16, DIG. 21; 252/512, 514, 518, 521, 519, 513; 523/137

[56] References Cited

U.S. PATENT DOCUMENTS 3,963,664 6/1976 Ozawa et al. ..................... 524/607
4,452,727 6/1984 Frommer et al. .................. 252/518

Primary Examiner—Josephine L. Barr
Attorney, Agent, or Firm—Richard C. Stewart, II; Gerhard H. Fuchs

[57] ABSTRACT

Process for reducing the resistivity of polymers, by forming a composition comprised of such polymers and one or more metal salts, and treating such a composition with a reagent to form the corresponding carbonate, sulfide and/or oxide salts of such metal salts on and in the surfaces of the polymer.

21 Claims, No Drawings

PROCESS FOR PREPARING CONDUCTING POLYMERIC COMPOSITIONS

BACKGROUND OF THE INVENTION

1. Field of the Art

This invention relates to processes for preparing polymeric compositions having improved anti-static properties. More particularly, this invention relates to a process for preparing such polymeric compositions in which metal salts and/or oxides having reduced resistivities are introduced into a polymer in or on its surface.

2. Description of the Prior Art

Normally dry polymeric compositions have high resistivities. For example a well known polyamide, polycaprolactam, has a resistivity of about $10^{15}$ ohm cm. As result when such compositions are employed in the construction of articles, such as fibers, wall coverings, articles of furnishings, and other textile articles, such articles tend to accumulate static electricity.

Several methods have been proposed in the prior art for rendering articles conductive, and thereby improving their anti-static properties. One simple method of making such articles conductive consists of incorporating metal or graphite fibers into bundles with fibers composed of a polymeric composition. This method however, provides several adverse effects. For example, articles composed of such bicomponent bundles do not dye as uniformly as would be expected of an article composed of only polymer fibers. Moreover, only the metal or graphite fibers are conductive, as a result, if the article is employed as a heating surface, the heat is not liberated at all points of the article and remains localized around the metal or graphite wires.

In another method disclosed in French Pat. No. 644,429, fibrous materials are rendered more conductive by metallization. In this process, the materials are immersed in a cuproammonium bath to which silver nitrate has been added, followed by immersion in a coagulation bath. The material is then treated with hydrogen sulfide and with an electrolyte bath. At least one prior art reference has indicated that this process is not fully satisfactory because the numerous process steps required, make it an expensive process.

In another such process described in U.S. Pat. No. 3,940,533, an article is exposed to hydrogen sulfide at superatmospheric pressure or treated with an aqueous bath of thioacetamide or thiourea, and is then immersed in an aqueous solution of a copper, silver, tin, lead or mercury salt. As a result of such treatment, the salt reacts with the hydrogen sulfide to form an electrically conductive metal deposit on the article. In U.S. Pat. No. 3,983,286, it discloses that the adhesion of the salt applied by the above identified procedure can be improved by carrying out the immersion step in the presence of a polyphenol.

SUMMARY OF THE INVENTION

In accordance with this invention there is provided a process for producing an adherent surface deposit of a metal oxide and/or salt on and in the surface of articles composed of polymeric materials, thereby decreasing their electrical resistivities and improving their anti-static properties. The process of this invention for improving the anti-static properties of a polymeric composition comprises the steps of:

(A) forming a polymeric composition comprising a dispersion or solution of one or more first metal salts in one or more polymers, each of said first metal salts being reactive with a reagent selected from the group consisting of:

(1) a mixture of vapors of a solvent which is capable of leaching said first metal salt from said composition and gaseous carbon dioxide;

(2) a mixture of said vapors and gaseous hydrogen sulfide;

(3) a solution comprising hydrogen sulfide and said solvent;

(4) a solution comprising carbonate ions and said solvent; and (5) a combination of one or more of the reagents of subparagraphs 1, 2, 3 and 4;

to form the corresponding sulfide, carbonate and/or oxide salt of said final metal salt having a resistivity which is less than the resistivity of said polymers and which is substantially insoluble in said solvent;

(B) treating said polymeric composition with one or more of said reagents thereby leaching said dispersed first metal salt out of said composition such that said first metal salt reacts with said reagent forming said carbonate, sulfide and/or oxide salt on or in the surface of said polymer in an amount sufficient to decrease the resistivity of said polymer.

As used herein "resistivity" is defined as the constant $\rho$ (in ohm cm) in the relationship $R = \rho L/A$ where R is the resistance in ohms, A is the cross sectional area in centimeters squared and L is the length in centimeters. The conductivity is defined as $1/\rho$ and is in units of $\text{ohm}^{-1} \text{cm}^{-1}$.

Resistance is measured by an application of Ohms law $$E = IR$$

wherein I is the current, E is the voltage and R is the resistance, and where the voltage and current are measured. To minimize polarization effects, voltages are selected to give small current readings that are detected with a sensitive current detecting device such as an electrometer. With insulating or high resistance materials, the number of charge carriers may be very small which give time dependent polarization effects and departures from Ohms law. Under these conditions one may compare the apparent ohmic resistances by measuring the current at a fix time generally 3 to 10 minutes after the application of a voltage across a sample of fixed dimensions.

DETAILED DESCRIPTION OF THE INVENTION

The process of this invention can be conveniently carried out in two essential process steps. The first essential step of the process of this invention comprises forming a polymeric composition comprising a dispersion or solution of one or more first metal salts in an appropriate polymer. The method of forming such a polymeric composition is not critical, and conventional procedures can be employed. For example, the polymeric composition can be prepared by blending or mixing the essential ingredients, and other optional components, as uniformly as possible employing any conventional blending means. Appropriate blending means, such as melt extrusion, batch melting and the like, are well known in the art. Accordingly only a few illustrative examples will be described briefly and useful means will not be described herein in great detail. In one useful procedure, the blending procedure can be carried out at elevated temperatures, above the melting point of the polymer and the metal salt in a suitable form as for example, granules, pellets and preferably powders of from about 1 micro meters to about 13 micrometers in size, can be added to the melt with vigorous stirring. Stirring is continued until a homogeneous composition is formed. The metal salt can also be added to the melt coated on the surface of small particle or inert powders, i.e. from about 0.1 micro meters to about 5 micrometers, which have high surface volume ratios. The use of such inert powders, as for example fused silica, fused alumina, carbon black and aerogels, and hydrogels of silica or alumina, helps to reduce the amount of first metal salt required to provide optimum results.

The process conditions of the first essential step are not critical, and can be varied widely as desired to provide the desired polymeric composition. For example blending temperatures and pressures, and the order of addition of the various components are not critical and may be varied as desired provided that a substantially homogeneous composition results. The blending procedure can be carried out at elevated temperatures, in which case the polymer component is melted, and the salt is added and mixed while vigorously stirring the melt. Similarly, the polymer component and the salt component can be granulated, and the granulated components mixed dry in a suitable blender, as for example a Branbury mixer, or the like as uniformly as possible. Thereafter the mixture is melted, extruded and cooled.

In another useful procedure the composition can be formed by mixing monomer of an appropriate polymer with a suitable metal salt. Thereafter, the composition can be formed by polymerizing the monomer employing conventional polymerization techniques.

In still another useful procedure, the polymeric composition can be formulated by dissolving the components in an appropriate inert solvent, after which the solvent is removed by evaporation, or other conventional means are employed to remove the solvent to provide the desired composition. The type of solvent employed is not critical, the only requirements being that it is inert to the components of the polymeric composition; and it is capable of solubilizing the various components, or at least forming dispersions thereof. In yet another useful procedure, the salt component can be dissolved in a solvent such as water which is diffusible in the polymer component or which is capable of wetting the surface and thereafter, the solution and the polymer are contacted and the solution diffuses in the surface or wets the surface of the polymer. As is apparent from the foregoing, the type of solvent employed will depend on the polymer employed. Illustrative of permissible solvents are water, acetonitrile, dimethylacetamide, dimethylformamide and the like. The polymer is then dried and can be used as the polymer component in the other step of the process of this invention.

Polymers for use in the practice of this invention are also not critical, and can be varied widely as desired. Such polymers are well known compounds which are described in detail in the prior art, and will not be described herein in any great detail. In summary, useful polymeric materials include thermoplastic polymers, thermosetting polymers and elastomeric polymers. Illustrative of useful thermoplastic polymers are polyolefins, such as high or low density polyethylene, polypropylene, ethylenepropylene copolymers and the like; polyvinyl polymers, such as polyvinyl chloride, polyvinyl acetate copolymers of vinyl chloride and the like; polysulfones, polystyrenes, acrylonitrile butadiene-styrene copolymers and the like; polyamides, such as poly(hexamethylene adipamide), polycaprolactam, poly(hexamethylene sebacamide), poly (undecanamide); poly(lauryl-lactam), poly(hexamethylene azelamide) and the like; the saturated polyesters such as poly(ethylene terephthalate), poly(butylene terephthalate) and the like; polycarbonates; polyacetates; polyacrylic compounds, such as poly(aryclicacid) poly(butylacrylate), poly(ethylacrylate), poly(methylacrylate) and the like; cellulose esters; and polyurethanes or polyamides-imides. Exemplary of useful thermo-setting polymers are phenolic resins, the aminoplasts, the unsaturated polyesters, polyepoxides, and the polyimides; and useful elastomers include natural or synthetic rubbers, silicone rubbers and polyurethane elastomers.

Polyester compositions and polyamide compositions are preferred for use in the process of this invention as the polymeric component. The polyester composition of choice is the condensation product of a benzene based aromatic dicarboxylic acid having from about 8 to about 24 carbon atoms, such as terephthalic acid, isophthalic acid and the like, and a cycloaliphatic diol such as 1,4-cyclohexane dimethyl glycol, 1,4-cyclohexanediol, and the like, and, especially an aliphatic diol having from about 2 to about 6 carbon atoms, such as ethylene glycol, neopentyl glycol, 1,4-butanediol, propylene glycol and the like. Illustrative of such useful and particularly preferred polyesters are poly(ethylene terephthalate), poly(1,4-cyclohexane dimethyl terephthalate) and poly(butylene terephthalate). Among these polyesters of choice, poly(ethylene terephthalate) and other preferred polyesters can contain minor amounts, up to 5%, of other comonomers such as diethylene glycol, 1,4-butanediol; 1,4-cyclohexane dimethyl diol; glutaric acid, and the like.

The polyamide of choice is obtained by polycondensation of diacids and diamines, and by the polymerization of lactams. Among the polyamides of choice poly(hexamethylene adipamide), and poly(caprolactam) are particularly preferred.

Metal salts suitable for use in the practice of the first step of the process of this invention are those which are reactive with a reagent selected from the group consisting of solvated carbonate ions; solutions of hydrogen sulfide; and hydrogen sulfide and/or carbon dioxide vapor, each admixed with a suitable solvent vapor, to form another second metal salt and/or oxide having a resistivity which is less than the resistivity of said polymer. Such salts will also be capable of being leached out of the composition to its surface when subjected to some leaching solvent. Illustrative of useful metal salts are the salts of inorganic acids of the transition metals, and metals of Groups IIa, Va, Ib, Vb, IIIb, IIb and VIII of the Periodic Table, such as the halide, nitrate, sulfate, phosphate, carbonate, and like salts of such metals as copper, iron, nickel, chromium, tin, silver, aluminum, calcium and the like. Also useful are the organic metal salts of organic acids, such as the oleate, acetate, formate, octanoate, butyrate, benzoate, stearate, propionate and like organic acid salts of the aforementioned metals.

Metal salts preferred for use in the process of this invention are those which are reactive with the above-identified reagents to form metal carbonate, and/or sulfide salts, or oxide having resistivities of less than about $10^{10}$ ohm cm and preferably less than $10^8$ ohm cm. Illustrative of such preferred metal salts are the metal salts of halides, as for example, cupric chloride, ferric chloride, aluminum chloride, chromium chloride and the like; the salts of nitric acid, such as silver nitrate, and the like; and metal salts of organic acid such as cupric acetate and the like. Amongst these preferred metal salts the polymer soluble metal salts of cupric formate, cupric acetate, silver nitrate, cupric chloride, aluminum chloride and ferric chloride are particularly preferred.

Such metal salts are well known compounds which can be obtained from commercial sources or prepared in accordance with known preparative techniques. For example, silver nitrate, cupric chloride, ferric chloride and aluminum chloride can be obtained commercially from Aldrich Chemical Company.

The quantity of metal salt included in the composition is such that when the process of this invention is completed, i.e. the composition of the first essential step is subjected to the second essential step of this invention, the electrical resistivity of the polymer has been decreased to the extent desired. When all other process variables are constant, generally, the greater the quantity of metal salt included in the polymeric composition product of the first step, the greater the decrease in the resistivity of the final polymer product of the last step; and, conversely, the less the quantity of metal salt in the composition of the first step, the less the decrease in the resistivity of the final product of the last step. In the preferred embodiments of this invention, the quantity of metal salt incorporated into the polymeric composition product of the first step is in the range of from about 0.01 to 20 weight percent based on the weight of the composition, and in the particularly preferred embodiments, the quantity of metal salt is in the range of from about 0.1 to about 10 weight percent on the same basis.

In addition to the above-described essential components, the composition product of the first step can include various optional compounds which are additives commonly employed with the above described polymer resins and which can be added to the composition during the composition forming step. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, and accordingly will not be described herein in detail.

In the second and last essential step of the process of the invention, the composition product of the first step is treated with a reagent comprised of one or more solvents and/or vapors of such solvents and a carbonate, oxide and/or sulfide forming component. The solvent employed in this process step should be effective to leach the first metal salt from the polymeric composition onto and near its outer surface at an economical rate, so that the carbonate, oxide and/or sulfide forming component in the reagent is effective to convert the first metal salt into the corresponding substantially solvent insoluble carbonate, oxide and/or sulfide salt. In the preferred embodiments of this invention various procedures can be employed for carrying out this step. In one preferred embodiment, the composition is contacted with a gaseous mixture of the reagent, as for example, a gaseous mixture of hydrogen sulfide or carbon dioxide and some solvent vapor, as for example, water vapor, in any conventional manner. In employing this treating procedure, the contact is preferably carried out at higher hydrogen sulfide and carbon dioxide pressure which results in shorter treating or contact times. Alternatively, the treating step can be carried out by immersing the article into a solution, dispersion or mixture of a metal carbonate, such as sodium carbonate, and the like, or hydrogen sulfide in an appropriate solvent, as for example, water or and an organic liquid which is a solvent or swelling agent for the polymer component of the composition. Useful organic liquid may vary widely with the polymer and metal salt components employed, and include, such hydrocarbon organic liquids as toluene; xylene; benzene; halogenated hydrocarbons, such as chloromethane; acetonitrile; dimethylformamide; dimethylacetamide; and the like. While this solution treating procedure can be carried out at lower temperatures, best results are obtained when elevated temperatures, i.e. up to the boiling point of the solvent, are employed.

Treating or contact times are not critical and will vary widely depending on such factors as treating procedures employed, concentration and type of metal salt, polymer, and other factors known to those of skill in the art. In the preferred embodiments of this invention, treating or contact times can vary from a few seconds up to two or three days or more. In the particularly preferred embodiments of this invention treating or contact times will vary from a few seconds to 24 hours and more.

In an optional step, the treated composition may be further subjected to a metallization step whereby the metal carbonate or sulfide salt, or oxide is converted to elemental metal. Such metallization procedures are well known in the art, as for example, the procedures described in detail in Comprehensive Inorganic Chemistry by J. C. Bailar, H. J. Emeleus, R. Nyholm and A. F. TrotmanDickenson. Accordingly these procedures will not be described herein in great detail.

It is well known that the anti-static properties of a composition are inversely related to its resistivity and directly related to its conductivity. Thus, through utilization of the decreased electrical resistivity obtained through use of the process of this invention an improvement in the anti-static properties of articles of clothing, carpeting and the like can be obtained. Furthermore, such compositions can be employed as heating surfaces; as substrates for electrical deposition of metals, such as, nickel, copper, iron, chromium and the like; or electrostatic and electromagnetic shields for protective enclosure of electronic equipment, such as computer modules; as shields against electrical discharge from electric motors and from medium and high voltage cables; as shields against high frequency radiation such as radio waves and infrared radiation; and as heat reflecting windows or shields in solar energy devices.

The following specific examples are presented to more particularly illustrate the invention, and should not be construed as being limitations on the scope and spirit of the inventions.

EXAMPLE I

Preparation of Nylon 6 and Calcium Chloride Composition

A mixture of 100 parts of Nylon 6 with 10 parts by weight of $CaCl_2$ was prepared by adding 10.00 grams of Nylon 6 and 1.000 grams of $CaCl_2$ to 100 ml of 85% formic acid. The Nylon 6 used was additive free and had a weight average molecular weight of 41,000. The solution was stirred for 4 hours at 50° C. A film was cast on a flat glass plate from the solution and kept at room temperature for 24 hours. It was further dried in a vacuum oven at 100° C. for 24 hours. The dried film was then placed in a heated press, molded into a 254 μm (10 mil) film at 240° C. and quickly quenched.

EXAMPLE II

Preparation of Nylon 6 and Calcium Carbonate Composition

The composition of Example I was divided into two samples (each sample 254 m (10 mils) in thickness). Sample 1 weighed 0.2510 grams and sample 2 weighed 0.2898 g. Sample 1 was placed in a container and 100 ml of water was poured over the sample completely immersing it. Sample 1, which had been optically clear, immediately became opaque. Sample 2 was placed in a container and an aqueous solution of 5 g of sodium carbonate in 100 ml of water was poured over the sample, completely immersing it. This sample which had also been optically clear, immediately became opaque, and white particles appeared on the surface of the sample. After about 16 hours, the samples were removed from the container, and each was rinsed three times in de-ionized water. Sample 2 had an uneven surface, and there was some white precipitate in the aqueous solution. Both samples were placed in a vacuum oven at 80° C. for about 4 hours. Substantially all of the calcium carbonate in the composition of Example I had been leached out by the water. Based on weight gain approximately 66 percent of the calcium carbonate produced remained in or on sample 2. Scanning electron microscope-electron probe experiments showed a thin i.e., less than 1 μm layer of calcium carbonate on the surface of the sample.

EXAMPLE III

Preparation of Films of Nylon 6 and Copper Salts

Nylon 6 (Mw=41,000) (13.60 grams) was solubilized in 100 ml of 95-97% Formic Acid. Using this base solution, four different solutions of Nylon 6 in formic acid with 1.36 grams, 2.72 grams, 6.80 grams and 13.60 grams of Cupric formate were prepared. Water was added in sufficient amounts to solubilize the cupric formate and the solutions stirred and heated at about 50° C. until dissolution was completed. Films of thickness between 25 μm (1 mil) and 125 μm (5 mil) were cast on glass plates and dried. Films were placed in a solution of 132 grams of $Na_2CO_3$ in 400 ml of $H_2O$ for various times up to 24 hrs. A subsequent rapid washing in water was also made to remove residual $Na_2CO_3$. Conductivity measurements were made which indicated that the conductivity of the films was greater than that of Nylon 6 which includes no additives.

EXAMPLE IV

Preparation of Nylon 66 and Copper Salts Composition

Employing the procedure of EXAMPLE III, a composition containing Nylon 66 and 20 weight percent cupric chloride is prepared. The composition is placed into a container of 100 ml of an aqueous solution of 20 g of sodium carbonate. After 4 hours the sample is removed and rinsed three times in de-ionized water. The sample is placed in a vacuum oven at 80° C. for about 4 hours. The resulting sample has a thin layer of a copper compound on and in its surface, and has reduced resistivity as compared to untreated Nylon 66.

EXAMPLE V

Preparation of Nylon 6 and Chromium Compound Composition

Employing the procedure of EXAMPLE III, a composition containing Nylon 66 and 25 weight percent chromous chloride is prepared. The composition is placed into a container of 100 ml of an aqueous solution of 20 g of sodium carbonate. After 1 hour the sample is removed and rinsed three times in de-ionized water. The sample is placed in a vacuum oven at 80° C. for about 4 hours. The resulting sample has a thin layer of a chromium compound on and in its surface, and has reduced resistivity as compared to untreated Nylon 66.

EXAMPLE VI

Preparation of Nylon 66 and Silver Compound Composition

Employing the procedure of EXAMPLE III, a composition containing Nylon 66 and 20 weight percent silver nitrate is prepared. The composition is placed into a container of 100 ml of an aqueous solution of 20 g of sodium carbonate. After 16 hours the sample is removed and rinsed three times in de-ionized water. The sample is placed in a vacuum oven at 80° C. for about 4 hours. The resulting sample has a thin layer of a silver compound on and in its surface, and has reduced resistivity as compared to untreated Nylon 66.

EXAMPLE VII

Preparation of Nylon 6 and Stanous Oxide Composition

Employing the procedure of EXAMPLE III, a composition containing Nylon 4 and 10 weight percent stannic chloride is prepared. The composition is placed into a container of 100 ml of an aqueous solution of 20 g of sodium carbonate. After 2 hours the sample is removed and rinsed three times in de-ionized water. The sample is placed in a vacuum oven at 80° C. for about 4 hours. The resulting sample has a thin layer of stannous oxide on and in its surface, and has reduced resistivity as compared to untreated Nylon 66.

EXAMPLE VIII

Preparation of Nylon 12 and Cupric Compound Composition

Employing the procedure of EXAMPLE III, a composition containing Nylon 12 and 10 weight percent cupric chloride is prepared. The composition is placed into a container of 100 ml of an aqueous solution of 20 g of sodium carbonate. After 10 hours the sample is removed and rinsed three times in de-ionized water. The sample is placed in a vacuum oven at 80° C. for about 4 hours. The resulting sample has a thin layer of a copper compound on and in its surface, and has reduced resistivity as compared to untreated Nylon 66.

EXAMPLE IX

Preparation of Nylon 11 and Stannous Oxide Composition

Employing the procedure of EXAMPLE III, a composition containing Nylon 11 and 14 weight percent stannic chloride is prepared. The composition is placed into a container of 100 ml of an aqueous solution of 20 g of sodium carbonate. After 2 hours the sample is removed and rinsed three times in de-ionized water. The sample is placed in a vacuum oven at 80° C. for about 4 hours. The resulting sample has a thin layer of stannous oxide on and in its surface, and has reduced resistivity as compared to untreated Nylon 66.

EXAMPLE X

A composition consisting of 2 percent by weight of cupric chloride and 98 percent by weight of poly(caprolactam) is melt blended to ensure uniform distribution of the salt in the poly(caprolactam). The resulting mixture is extruded through a multifilament fiber die. The resultant filaments are passed through a bath containing a 10% solution of sodium carbonate in water. The filaments are subsequently dried and their electrical resistance measured. The electrical resistivity is found to be substantially less than similarly treated nylon filaments which did not contain cupric chloride. When nylon filaments not originally mixed with cupric chloride are blended with filaments of the reduced resistivity mixture, the total blend was found to have reduced resistivity.

EXAMPLE XI

The resistivity of poly(caprolactam) (Nylon 6) is very high of the order of $10^{15}$ ohm cm which causes a high walking potential of about 10 Kv. A series of experiments were carried out to demonstrate how the process of this invention provides significant reductions in the resistivity of Nylon 6. A series of films approximately 3 mils ($\pm 1$ mil) in thickness and containing 1.25% copper added as $CuCl_2$ were prepared. Several of the films were subjected to the process of this invention by soaking the films for 10 minutes in a bath containing a boiling aqueous solution of sodium carbonate followed by two 3 minute washings in distilled water. The films were air dried and their electrical resistance measured using a General Radio Model 1864 Megometer. As a control, the electrical resistance of untreated Nylon 6 was also measured. The results of these experiments are set forth in the following Table I.

TABLE I

| Expt | Sample | Resistivity (ohm cm) |
|---|---|---|
| 1 | Nylon 6 + 1.25% Cu | $8.7 \times 10^{11}$ |
| 2 | Nylon 6 + 1.25% Cu | $5.7 \times 10^{11}$ |
| 3 | Nylon 6 + 1.25% Cu | $5.0 \times 10^{11}$ |
| 4 | Nylon 6 + 1.25% Cu | $4.6 \times 10^{10}$ |
| 5 | Control | greater than $10^{15}$ |
| 6 | Control | greater than $10^{15}$ |
| 7 | Control | greater than $10^{15}$ |

The foregoing detailed description of the invention has been given for clearness of understanding only, and no necessary limitations are to be understood therefrom. The invention is not limited to the exact details herein shown and described, and will encompass obvious modifications which will occur to those of skill in the art in light of the appended claims.

What is claimed is:

1. A process for improving the anti-static properties of polymer compositions, which comprises:
   (a) forming a polymeric composition comprising an intimate mixture of one or more first metal salts and one or more polymers, each of said first metal salts being reactive with a reagent selected from the group consisting of:
   (1) a mixture of vapors of a solvent which is capable of leaching at least one of said first metal salts from said composition and gaseous carbon dioxide;
   (2) a mixture of said vapors and gaseous hydrogen sulfide;
   (3) a solution comprising hydrogen sulfide and said solvent;
   (4) a solution comprising carbonate ions and said solvent; and
   (5) a combination of one or more of the reagents of sub-paragraphs 1,2,3, and 4, hereof to form the corresponding carbonate, sulfide, or oxide salt of said first metal salt, said corresponding carbonate, sulfide or oxide salt having an electrical resistivity which is less than the electrical resistivity of said one or more polymers, and being substantially insoluble in said solvent; and
   (b) treating said composition with one or more of said reagents, thereby leaching said one or more first metal salts out of said one or more polymers such that said first metal salts react with said reagent forming said corresponding carbonate, sulfide or oxide salts thereof on, in or on and in the surface of said one or more polymers in an amount sufficient to decrease the electrical resistivity of said polymers.

2. A process according to claim 1 wherein said reagent is an aqueous solution of carbonate anions.

3. A process according to claim 1 wherein said forming step (a) comprises:
   mixing said metal salt with monomers of said polymers; and polymerizing said monomers.

4. A process according to claim 1 wherein said forming step (a) comprises:
   mixing said metal salt with said polymers in a particulate form;
   heating said polymers to or above their melting points; and
   extruding said melted polymers.

5. A process according to claim 1 wherein said polymers are selected from the group consisting of polyamides.

6. A process according to claim 5 wherein said composition comprises a polyamide which is polycaprolactam.

7. A process according to claim 1, 5 or 6 wherein said metal salts are soluble in said polymers or their monomers.

8. A process according to claim 5 or 6 wherein said first metal salts are polymer soluble salts of metals whose oxides carbonates and sulfides have resistivities which are equal to or less than about $10^{10}$ ohm cm.

9. A process according to claim 8 wherein said metal salts are halide salts of the transition metals and Group III A metals.

10. A process according to claim 9 wherein said metals are selected from the group consisting of copper, tin, cadmium, zinc, chromium and silver.

11. A process according to claim 1 wherein said treating step (B) comprises extruding said composition into an aqueous solution of one or more water soluble carbonates.

12. A process according to claim 11 wherein said water soluble carbonate is sodium carbonate.

13. A process according to claim 5 or 6 wherein said polymer composition having improved anti-static properties has a resistivity equal to or less than about $10^{10}$ ohm cm.

14. A process according to claim 1 which further comprises reducing said metal cations of said corresponding metal carbonates, sulfides or oxides to the metallic state.

15. A process according to claim 1 wherein said intimate mixture is a solid solution.

16. A process according to claim 1 wherein the amount of said first metal salts included in said composition is from about 0.01 to about 20 weight percent based on the total weight of the composition.

17. A process according to claim 16 wherein said weight percent is from about 0.1 to about 10.

18. A process according to claim 1 wherein said composition is treated with said one or more reagents up to about twenty-four hours.

19. A process according to claim 1 wherein said composition is treated with one or more of said reagents to form a carbonate salt.

20. A process according to claim 1 wherein said composition is treated with one or more of said reagents to form a sulfide salt.

21. A process for improving the anti-static properties of a polymer composition which comprises:
 (a) forming a polymer composition comprising an intimate mixture of a transition metal salt and a polymer selected from the group consisting of polyesters and polyamides; and
 (b) treating said composition with a solution containing carbonate ions and a solvent capable of leaching said transition metal salt from said composition, thereby leaching said salt from out of said polymer such that said salt reacts with said carbonate ions in said solution forming the corresponding salt thereof on, in, or on and in the surface of said polymer in an amount sufficient to decrease the electrical resistivity of said polymer.

* * * * *